Dec. 29, 1942.    K. RABE    2,306,902
TRACTOR
Filed May 1, 1940    2 Sheets-Sheet 1

INVENTOR.
Karl Rabe
BY
ATTORNEYS

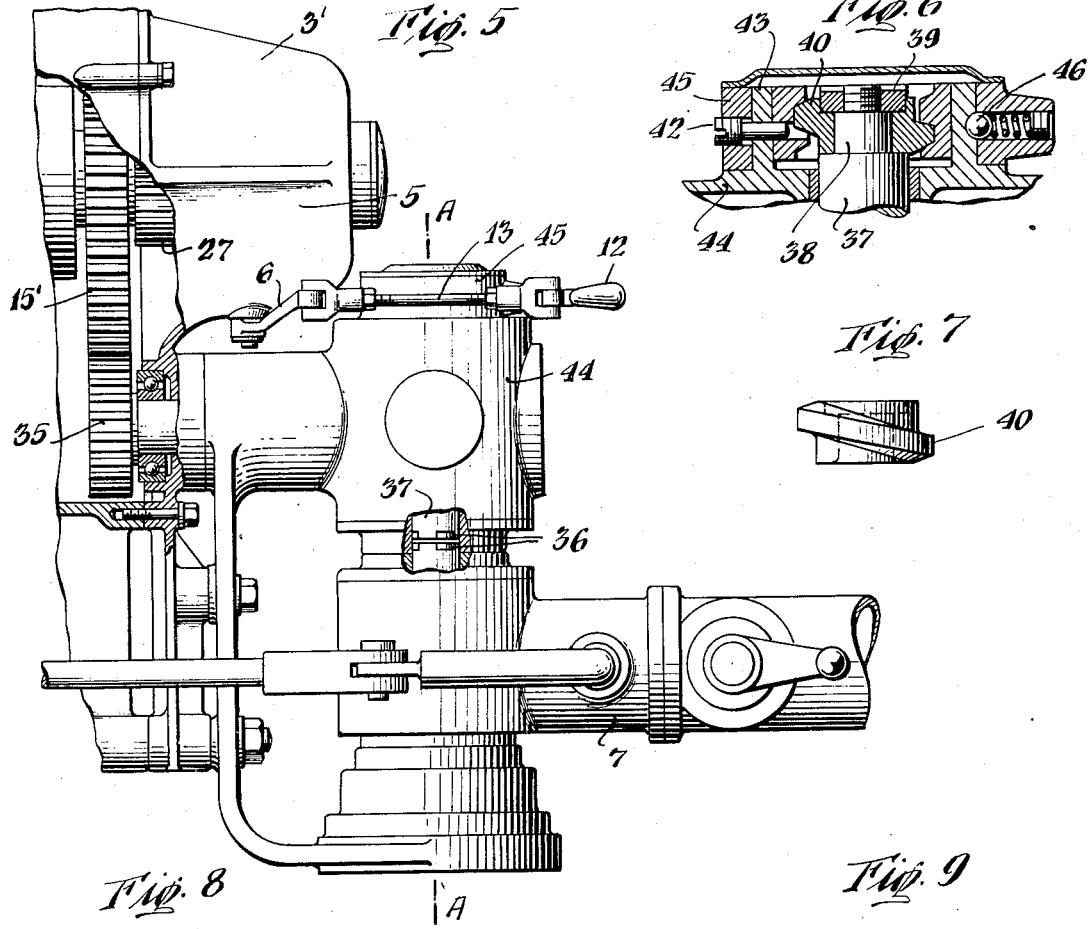
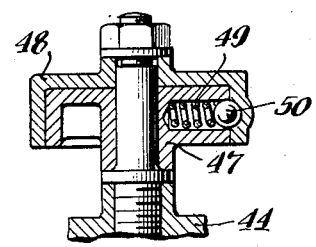
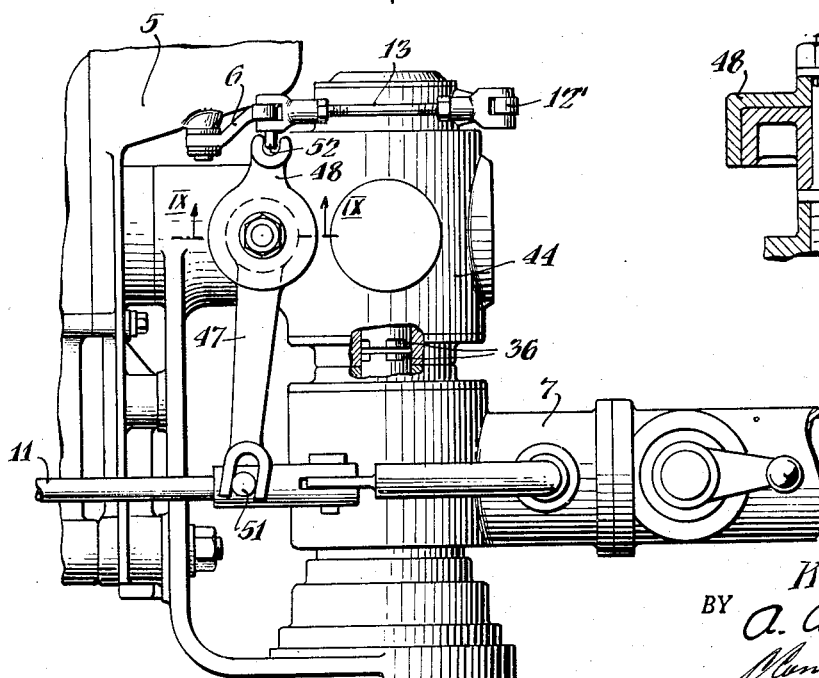

Patented Dec. 29, 1942

2,306,902

UNITED STATES PATENT OFFICE 2,306,902

TRACTOR

Karl Rabe, Stuttgart, Germany; vested in the Alien Property Custodian

Application May 1, 1940, Serial No. 332,772
In Germany March 25, 1939

20 Claims. (Cl. 97—40)

This invention relates to a tractor, and more particularly to one which is adaptable for the drive of special soil-working apparatus.

An object of this invention is to provide a tractor which is suitable for a plurality of uses, particularly on a farm.

Another object of this invention is to provide a simple arrangement whereby a tractor built for usual speeds and usual farm uses, may be readily converted for use at extremely slow speeds with special soil-working apparatus, such as a rotary cultivator.

Still another object of this invention is the provision of an arrangement whereby a tractor may be converted from its usual uses to special uses requiring a special drive, merely by the removal of the reduction gearing and the addition of a supplemental transmission in place thereof.

A further object of this invention is the provision of a simplified arrangement for driving a rotary cultivator from the transmission of a tractor, with means for simultaneously reducing the tractor speed during the operation of the cultivator.

A more specific object of this invention lies in the provision of a supplemental unit including a rotary cultivator, its drive and control, and a supplemental change-speed gearing, which may be simply and quickly added to a tractor in place of its usual reduction gear, said supplemental change-speed gearing providing a drive to the cultivator and simultaneously permitting a lowering in the driving speed of the tractor as compared with the lower speed possible by its usual drive.

Further objects and advantages of this invention will be apparent from a consideration of the specification as illustrated by the accompanying drawings of possible embodiments of the invention, in which drawings:

Fig. 5 is a partial plan view, partially broken away, along the line V—V of Fig. 4, illustrating the arrangement of the supplemental transmission and cultivator drive;

Fig. 6 is an enlarged vertical cross-sectional view through the control for the driving mechanism of the cultivator;

Fig. 7 is a full view of a detail of the control mechanism illustrated in Fig. 6;

Fig. 8 is a plan view, similar to Fig. 5, illustrating a modification of an interlock control between the cultivator drive and its raising and lowering mechanism; and Fig. 9 is an enlarged horizontal cross-sectional view along the line IX—IX of Fig. 8, illustrating a detail of the interlock control mechanism.

Figure 1:
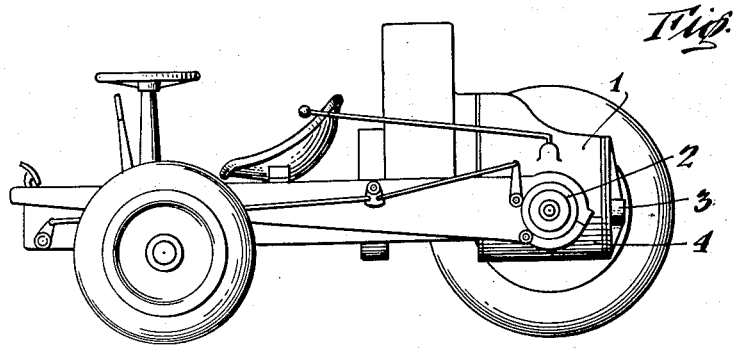
Fig. 1 is a side view of a tractor formed in accordance with this invention, with one of the driving wheels removed showing the transmission arrangement normally used for driving the tractor.

The tractor illustrated in Fig. 1, is provided with a more or less usual transmission, generally indicated at 1, and a more or less usual axle drive, generally indicated at 2. Access to this gearing is provided by a removable cover 3, and the drive between the transmission 1 and the axle drive 2 is preferably brought about through a reduction gearing, generally indicated at 4. While the details of this construction will be described hereinafter, it is sufficient to say for the present that by means of this drive, the tractor may be driven at speeds which will be necessary for its usual requirements. In other words, through this type of drive, the tractor may be given a top speed of 15 kilometers an hour or more, while in the lowest gear-ratio position of the transmission, the tractor will have a speed of approximately 4 kilometers an hour, which is proper for most ordinary farm purposes, such as plowing.

If, however, it is desired to use the tractor with certain special farm apparatus, such, for example, as a rotary cultivator, the tractor must be driven at a much lower speed. In accordance with this invention, such a transposition can readily be brought about as will be seen by the form of invention illustrated in Fig. 2, which is identical with that illustrated in Fig. 1, except that instead of the cover 3 and reduction gearing 4, there is now added in its place a cover 3' containing a two-stage supplemental transmission generally indicated at 5, the shifting from one stage to another being controlled by means such as a crank 6. Pivotally mounted about the axis A relatively to the cover 3', there is also provided a soil-working apparatus generally indicated at 7, and provided with rotary cultivator blade 8. The cultivator apparatus may be of any known construction, and in itself forms no part of the present invention.

Control of the crank 6 of the supplemental transmission 5 may be effected through a link 13 and a hand crank 12. The supplemental transmission 5 is preferably designed so that for the lowest speed of the transmission 1, the top speed of the supplemental transmission will give a drive of approximately 4 kilometers an hour, corresponding to the reduction gear in the original drive, while the lowest step of the supplemental transmission will give a driving speed of approximately 1 kilometer an hour, corresponding to the driving speed necessary for use with soil-working apparatus such as the rotary cultivator 7.

Figure 3:
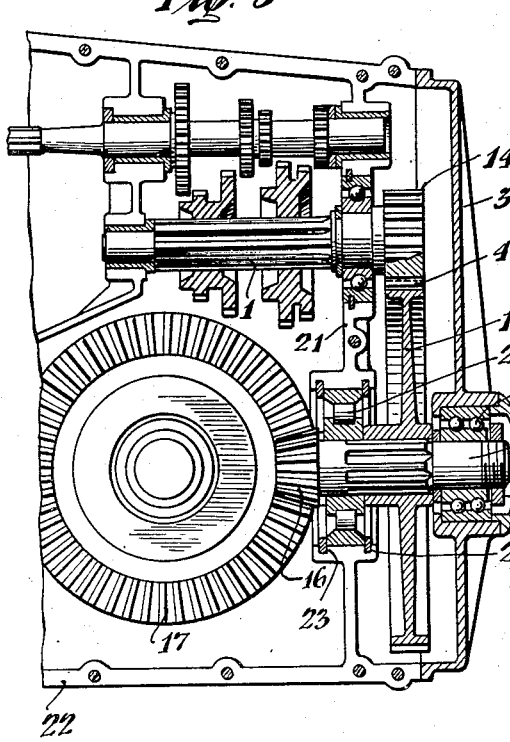
Fig. 3 is a longitudinal cross-sectional view on an enlarged scale of the transmission provided in the tractor illustrated in Fig. 1.

The details of the drive of the tractor illustrated in Fig. 1, are illustrated in Fig. 3. As can there be seen, the reduction gearing interconnecting the transmission 1 with the axle drive 2 preferably consists of a pinion 14, driven by the transmission 1, and meshing in turn with a gear wheel 15. The latter rotates a drive pinion 16 meshing with the bevel gears or gear 17 of the axle drive. The drive pinion 16 is preferably formed on the end of a small shaft 18 to which the gear wheel 15 is keyed, as indicated. The shaft 18 may be supported by bearings 19 and 20, the former mounted in the cover 3 and the latter in a wall 21 of the transmission housing 22. The bearing 20 is preferably held in place by suitable means such as the removable radially sprung sheet steel rings 23 and 24, while the bearing 19 is held in place against an abutment formed in the cover 3 by means of the threaded nut 25, accessible through a removable closure member 26.

It will be noted from a study of Fig. 3, that since the transmission 1 and the axle drive 2 are both positioned upon the same side of the reduction gearing 4, this construction readily adapts itself to the substitution of an additional supplemental transmission in place of the reduction gearing 4, without disturbing the major parts of the original transmission. Thus, in order to prepare the drive shown in Fig. 3 for the supplemental drive illustrated in Fig. 4, only the following steps are necessary. First, the covering plate 26 is removed and the nut 25 positioned thereunder unscrewed. Upon removal of the means (not shown) holding the covering 3 to the transmission housing 22, this covering may then be removed. With the covering 3 removed, the drive as a whole is now accessible and the keyed gear wheel 15 may be slid from the shaft 18. Upon the further removal of the ring 24, the shaft 18 together with the drive pinion 16 and the bearing 20 may then be taken out. The tractor is then ready for the addition of the supplemental transmission illustrated in Fig. 4.

The first step in adding the supplemental transmission is to insert a new shaft 18' formed on its end with a drive pinion 16'. The shaft 18' is provided with a bearing 20, which may be the same bearing as was removed previously, and this bearing is seated in the same recess in the transmission housing wall 21, and again held in place by the re-insertion of the ring 24. A double gear is then slid over the shaft 18' to a smooth portion next to the bearing 20. The double gear consists of a large gear 15', similar to the reduction gear 15, and an integral smaller gear 27. As contrasted with the gear wheel 15, the double gear is rotatable upon its shaft and not keyed thereto. A coupling member 28 is then slid over the keyed portion of the shaft 18', next to the double gear, and after this a small gear wheel 29 rotatably mounted on a smooth portion of the shaft. Now the substitute covering 3' is connected to the transmission housing 22 by preferably the same means (not shown) as were used to attach the original covering 3. The covering 3' contains a control fork 30 for actuating the coupling member 28, and pivotally mounted upon a shaft 31, to which is attached the control lever 6, described above in connection with Fig. 2. A gear 32 so mounted as to mesh with the small gear wheel 27 is keyed to a shaft 33 and, at the other end of which is also keyed a pinion 34 meshing with the small gear wheel 29. Any suitable means may be used to journal the shaft 33 within the covering member 3'. The coupling member 28 is adapted to engage either the small gear 27 of the double gear or the small gear wheel 29 upon movement thereof by the control lever 6 in the appropriate direction. For this purpose the gears 27 and 29 are provided with suitable notches or other openings which may be positively engaged by the coupling member 28. Similarly to the cover 3, the cover 3' may be provided with the bearing 19, the nut 25, and the small closure member 26 for supporting the far end of the shaft 18'.

Figure 4:
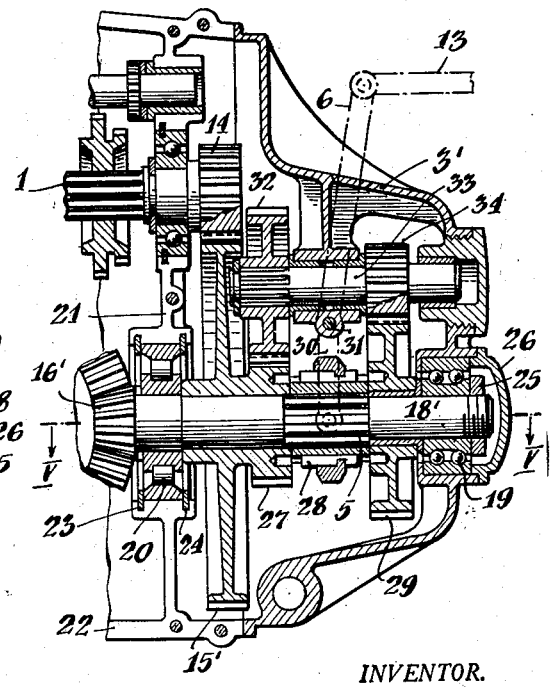
Fig. 4 is a longitudinal cross-sectional view on an enlarged scale of the transmission provided for the tractor illustrated in Fig. 2.

A study of the construction illustrated in Fig. 4, will indicate that when the control member 28 is moved toward the left for engagement with the double gear, power will be transmitted from the transmission 1 through the pinion 14, reduction gear 15', through the integral small gear 27 and the keyed coupling member 28 to the shaft 18' and the drive pinion 16', with the same transmission ratio as provided in the original replaced construction. However, when the coupling member 28 is moved toward the right for engagement with the second gear wheel 29, power from the pinion 14 will then be transmitted through the reduction gear 15', the small gear 27, gear wheels 32 and 33 to the second gear wheel 29, and then through the coupling member 28 and shaft 18' to the drive pinion 16'. The gear wheels 27, 32, 33 and 29 are so designed that the speed of the shaft 18' is reduced approximately to ¼ as compared to the drive through the reduction gear 15' alone. Thus, for example, if the speed of the tractor when the coupling member 28 is moved toward the left is 4 kilometers an hour, as predetermined by the position of the original transmission 1, when the coupling member 28 is moved toward the right, the speed of the tractor will then be approximately 1 kilometer an hour.

Figure 2:
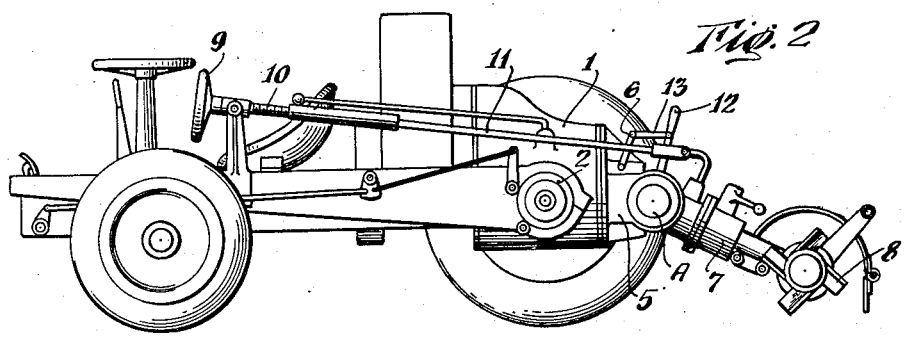
Fig. 2 is a side view, similar to Fig. 1, illustrating the same tractor as used with a supplemental transmission and drive for a rotary cultivator.

Fig. 5 illustrates the general relationship between the cultivator apparatus 7 and the manner in which the rotary cultivator is driven from the supplemental transmission. As can there be seen, the drive is taken off the supplemental transmission through a gear wheel 35 and connected to the drive of the rotary cultivator by means of a claw clutch 36 actuated by a longitudinal shifting of the drive shaft 37. The cultivator itself is suitably pivotally mounted about the axis A—A, as previously indicated in Fig. 2. As will be seen more clearly in Fig. 5 the cultivator is mounted on a rearward lateral extension of the cover 3'. This extension may either be formed integrally with the cover 3' or attached thereto in any suitable manner, and may take the form of a housing 44 and suitable means for pivotally mounting about a horizontal transverse axis. Since a positive drive of the rotary cultivator 8 is only necessary and desirable when the supplemental tractor transmission is in such a position as to provide a low driving speed, for example, 1 kilometer an hour, means may be provided for interlocking the shifting of the coupling member (Fig. 4) with the shifting of the drive shaft 37, engaging the driving mechanism of the rotary cultivator through the claw clutch 36. A preferred arrangement for accomplishing this is illustrated in more detail in Figs. 6 and 7. Such means may take the form of a control member 40 rotatably mounted upon an extension 38 of the shaft 37, and held in place in the axial direction by means such as a nut 39. About the control member 40 and in contact therewith is positioned a nut 41 connected through a pin 42, movable in a slot in the extension 43 of the housing member 44 by the hub portion 45 of the hand crank 12. If the crank is moved forwardly in the direction of the vehicle as seen in Fig. 2, through the hub portion 45 and the pin 42 it will turn the nut 41 and with it the control member 40 in the clockwise direction as seen from the free end of the shaft 37, which, in turn, will move the shaft 37 inwardly and thus couple it with the drive of the rotary cultivator through the claw clutch 36. Movement of the hand crank 12 in the opposite direction will correspondingly move the control member 40 in such a direction as to release the shaft 37 and the claw clutch 36. Through the link 13, the hand crank 12 is coupled with the supplemental transmission lever 6 in such a manner that when the crank 12 is moved in a direction to couple the shaft 37 with the drive of the rotary cultivator, the supplemental transmission by movement of the coupling member 28 will provide the drive at the lowest possible speed, which is the speed necessary when the rotary cultivator is running. However, upon movement of the hand crank 12 to disengage the shaft 37 and the claw clutch 36, the lever 6 will move in a direction so that the coupling member 28 will provide the higher drive for the tractor. By means of this arrangement, there is no danger of driving the tractor when the rotary cultivator is in operation at too high a speed, provided, of course, that the main transmission 1 is already in a suitable position. On the other hand, when the rotary cultivator is not being used, there is no reason for the extremely slow drive of the tractor and the transmission is accordingly automatically changed to the higher ratio. In order to insure a positive positioning of the hand crank 12 in either of its two end positions, the hub 45 thereof is preferably formed with a spring pressed ball 46, which will fit into appropriate recesses in the extension 43 of the housing 44.

As is illustrated in Fig. 2, the rotary cultivator is pivoted about the axis A, and can be raised and lowered for engagement and disengagement with the soil through a suitable apparatus which may consist of a hand wheel 9 having a threaded shaft 10, cooperating with a rod 11 connected to the cultivator structure. Rotation of the hand wheel 9 will accordingly raise or lower the cultivator 7 in a manner which will be at once apparent to those skilled in this art. It is obvious, furthermore, that there is no purpose in driving the rotary cultivator when it is in its raised position, while on the other hand there is no reason for lowering the cultivator unless it is being driven. For this reason the initiation of the drive of the cultivator through the claw clutch 36 may be correlated with the control for raising and lowering the cultivator, in the manner proposed by Figs. 8 and 9. The interlock between the control for the supplemental transmission and the drive of the rotary cultivator on the one hand, and the apparatus for raising and lowering the cultivator on the other hand, is provided by a pair of lever arms 47 and 48 co-axially pivoted at one end and there releasably interconnected with one another through a spring-pressed ball coupling 49, 50, as more clearly illustrated in Fig. 9. The outer ends of these arms are forked, the fork at the end of the lever 47 cooperating with a pin 51 on the control rod 11 of the raising and lowering apparatus, the fork on the end of the lever 48 cooperating with an extended pivot 52 between the lever arm 6, controlling the supplemental transmission and the link 13 leading to the control of the cultivator drive. The remainder of the apparatus is identical with that illustrated in Fig. 5, except that the hand crank 12 is not necessary in the modified form, and is replaced by an interconnecting lever arm 12'. A comparison of the interlock illustrated in Fig. 8, with the control system for the supplemental transmission and cultivator drive as explained in connection with Figs. 4, 5 and 6, will show that when the rod 11 is moved to the left as seen in Fig. 8 to raise the cultivator, the crank 6 will be moved to such a position as to, in turn, move the coupling member 28 to provide the higher speed of the supplemental transmission, while at the same time the control lever 12' will be moved in a direction as to disengage the claw clutch 36. However, when the control rod 11 is moved to the right to lower the cultivator, the control lever 6 will move the supplemental transmission to give the lower speed thereof, while simultaneously the control lever 12' will move the drive shaft 37 inwardly and the claw clutch 36 will become engaged to positively drive the rotary cultivator blade. The form of coupling illustrated in Fig. 9 between the two arms 47 and 48 takes care of the fact that the arm 47 will travel over a much wider arc than the arm 48, due to the greater movement involved in raising and lowering the cultivator 7. Assuming, for example, that it is desired to lower the cultivator from its totally raised position, at the beginning of the lowering operation the levers 47 and 48 are positively engaged through the spring and ball couplings 49, 50 and the arm 48 will accordingly actuate the supplemental transmission and cultivator drive until the arm 48 reaches the end of its necessary movement. At this point, however, the cultivator is still probably not in contact with the soil but requires further lowering. Since the arm 48 cannot move, while the arm 47 will, the connection between these two is then broken by the ball 50 moving out of its notch and riding on a smooth cylindrical surface. Reversely, when the cultivator is being raised, the arm 47 will not be positively coupled to the arm 48 until the cultivator has been raised to such a point that the ball at the pivoted end of the arm 47 will again engage the notch in the arm 48, whereupon in raising the cultivator further, the arm 48 will be moved to disengage the cultivator drive and move the supplemental transmission to the higher speed.

The invention as above described, is believed to fulfill all of the objects initially stated. As compared with prior structures, applicant has provided an arrangement whereby a tractor adapted for usual uses with variation in speed necessary for usual farm purposes, can be quickly and easily converted to a tractor to be used for special farm purposes requiring lower speed, as, for example, the driving of a rotary cultivator. It is to be pointed out, however, that the invention is not limited to the specific apparatus shown. For example, the supplemental gearing need not be in the form of a transmission, but may merely take the form of a further reduction gearing. In other cases, a more complicated transmission could be used, for example, one involving more than two supplemental stages. Obviously, the invention is not limited for use with rotary cultivators, but is adapted for use with any additional apparatus requiring special speed of the tractor and a special drive for such additional apparatus. The individual gears, bearings, clutches and the like may, too, be replaced by their equivalents, all as will be at once apparent to those skilled in this art. Accordingly, I do not intend to limit this invention to the forms of invention particularly shown and described, but only as may be required by the following claims.

I claim:

1. In a vehicle, a transmission housing having an open end, speed-change gears mounted within said housing, a gear driven by said speed-change gears, wheels for said vehicle, means including a bevel gear to form a drive for said wheels, a removable shaft having a driving pinion on one end meshing with said bevel gear and a gear wheel rotatable with said shaft and meshing with the gear driven by said speed-change gears, and a removable cover for the end of said transmission housing, containing bearing means for the other end of said removable shaft.

2. The combination according to claim 1, in which additional bearing means are mounted on said removable shaft, next to said driving pinion, and said housing is formed with a recess adapted to seat said bearing.

3. The combination according to claim 1, in which the speed-change gears are mounted on the same side of said gear wheel as the bevel gear and driving pinion.

4. In a vehicle, a transmission housing having an open end, speed-change gears mounted within said housing, a gear driven by said speed-change gears, wheels for said vehicle, means including a bevel gear to form a drive for said wheels, a removable shaft having a driving pinion integrally interconnected therewith at one end, meshing with said bevel gear, a first smooth shaft section next to said driving pinion, a keyed section next to said smooth section, and a second smooth section at its other end, a double gear rotatably mounted on said first smooth shaft section, having a relatively large gear wheel meshing with the gear driven by said speed-change gears, and a smaller gear provided with one or more coupling-receiving openings, a slidable coupling member non-rotatably mounted on the keyed section of said shaft, a second gear wheel rotatably mounted on the second smooth section of said shaft, and provided with one or more coupling-receiving openings facing those on said smaller gear, a removable cover for the end of said transmission housing containing bearing means for said shaft and a pair of interconnected gear wheels respectively adapted to mesh with the smaller gear and the second gear wheel on said shaft, and means for moving said coupling member into engagement with the coupling-receiving openings of said smaller gear or of said second gear wheel.

5. The combination according to claim 4, in which additional bearing means are mounted on said removable shaft next to said driving pinion, and said housing is formed with a recess adapted to seat said bearnig means.

6. The combination according to claim 4, in which the speed-change gears are mounted on the same side of said double gear as said double gear and driving pinion.

7. The combination according to claim 4, in combination with a housing interconnected with said cover, a rotary cultivator mounted on said housing, means for driving said cultivator from one of the gear wheels on said shaft, said means including a releasable coupling intermediate said shaft and the cultivator, and means interconnecting said releasable coupling with the means for moving said coupling member, in such a manner that when said coupling member engages said smaller gear said releasable coupling is released, and when said coupling member engages said second gear wheel, said releasable coupling is engaged.

8. The combination according to claim 4, in combination with a housing interconnected with said cover, a cultivator pivotally connected to said housing for movement about a substantially horizontal axis, and means for raising and lowering said cultivator from and into a ground-engaging position.

9. The combination according to claim 4, in combination with a housing interconnected with said cover, a rotary cultivator pivotally connected to said housing for movement about a substantially horizontal axis, means for raising and lowering said cultivator from and into a ground-engaging position, and means mounted within said housing for driving said cultivator from said shaft.

10. The combination according to claim 4, in combination with a housing interconnected with said cover, a rotary cultivator mounted on said housing, and means for driving said cultivator from said shaft.

11. In a vehicle of the class wherein power is transmitted from the variable-speed transmission to the axle drive thereof through a supplemental reduction gear accessible by the removal of a cover from the transmission housing, the combination of an additional speed-change transmission adapted to be inserted between said variable speed transmission and said axle drive in place of said supplemental reduction gear, said additional speed-change transmission having an enclosing cover adapted to fit onto said transmission housing in place of its original cover.

12. In a tractor of the class wherein power is transmitted from the variable speed transmission to the axle drive through a supplemental reduction gearing accessible by the removal of a cover from the transmission housing, the combination of an additional speed-change transmission adapted to be inserted between said variable speed transmission and said axle drive in place of said supplemental reduction gear, said additional speed-change transmission having an enclosing cover adapted to fit onto said transmission housing in place of its original cover, a rotary cultivator, and means for driving said cultivator from said additional speed-change transmission.

13. The combination according to claim 12, in combination with means for mounting said cultivator on said tractor on the opposite side of said additional speed-change transmission from said variable speed transmission and axle drive.

14. The combination according to claim 12, in which said additional speed-change transmission is a two-speed transmission, and said cultivator is driven thereby at only one of the speeds.

15. The combination according to claim 12, in which said additional speed-change transmission includes a shaft drivably connected to said axle drive and having two smooth shaft sections and a keyed section intermediate said smooth section, a double gear rotatably mounted on one of said smooth sections having a relatively large gear wheel meshing with the variable speed transmission and a smaller gear provided with one or more coupling-receiving openings, a slidable coupling member non-rotatably mounted on the keyed section, and a second gear rotatably mounted on the other smooth shaft section, and provided with one or more coupling-receiving openings facing those on said smaller gear, bearing means for said shaft, and a pair of interconnected gear wheels respectively adapted to mesh with the smaller gear and the second gear wheel on said shaft, mounted in said enclosing cover, and means for moving said coupling member into engagement with the coupling-receiving openings of said smaller gear or of said second gear wheel.

16. In a tractor of the class wherein power is transmitted from the variable speed transmission to the axle drive through a supplemental reduction gearing accessible by the removing of a cover from the transmission housing, the combination of an additional multi-stage speed-change transmission adapted to be inserted between said variable speed transmission and said axle drive in place of said supplemental reduction gear, said additional speed-change transmission having an enclosing cover adapted to fit onto said transmission housing in place of its original cover, a rotary cultivator, means including a clutch for driving said cultivator from said additional speed-change transmission, means for varying the ratio of said additional speed-change transmission, and means interlocking said ratio changing means and said clutch in such a manner that said cultivator is driven through said additional speed-change transmission during only one predetermined speed ratio of the latter.

17. The combination according to claim 16, in combination with means for pivotally connecting said cultivator to said tractor about a substantially horizontal transverse axis, and means for raising and lowering said cultivator from and into a ground-engaging position.

18. The combination according to claim 16, in combination with means for pivotally connecting said cultivator to said tractor about a substantially horizontal axis, means for raising and lowering said cultivator about said axis from and into a ground-engaging position, and means interconnecting said raising and lowering means with said interlocking means in such a manner that lowering of said cultivator initiates its drive through the additional speed-change transmission at the predetermined speed ratio, while raising of said cultivator disengages the drive of said cultivator and brings about a different speed-ratio of said additional speed-change transmission.

19. The combination according to claim 16, in combination with means for pivotally connecting said cultivator to said tractor about a substantially horizontal axis, means for raising and lowering said cultivator about said axis from and into a ground-engaging position, and means interconnecting said raising and lowering means with said interlocking means in such a manner that lowering of said cultivator initiates its drive through the additional speed-change transmission at the predetermined speed ratio, while raising of said cultivator disengages the drive of said cultivator and brings about a different speed-ratio of said additional speed-change transmission, said interconnecting means including further means whereby lowering of said cultivator initiates the drive at the beginning of the lowering operation, while raising of said cultivator disengages the drive at the end of the raising operation.

20. The combination according to claim 16, in combination with means for pivotally connecting said cultivator to said tractor about a substantially horizontal axis, means for raising and lowering said cultivator about said axis from and into a ground-engaging position, a pair of arms co-axially pivoted at one end and at their other ends respectively connected to said raising and lowering means and said interlocking means, and a releasable coupling interconnecting said arms in such a manner that upon lowering of said cultivator the drive thereof through said additional speed-change transmission at the predetermined speed-ratio is initiated through said arms and said interlocking means, while upon raising of said cultivator the drive thereof is not disengaged until the end of the raising operation.

KARL RABE.